(12) United States Patent
Trottier

(10) Patent No.: US 7,838,859 B2
(45) Date of Patent: Nov. 23, 2010

(54) FLUID OVERFILL PROBE WITH THERMAL STRESS PREVENTION

(75) Inventor: Robert R. Trottier, Andover, MA (US)

(73) Assignee: Scully Signal Company, Wilmington, MA (US)

( * ) Notice: Subject to any disclaimer, the term of this patent is extended or adjusted under 35 U.S.C. 154(b) by 247 days.

(21) Appl. No.: 12/240,511

(22) Filed: Sep. 29, 2008

(65) Prior Publication Data
US 2010/0078581 A1 Apr. 1, 2010

(51) Int. Cl.
*G01N 21/49* (2006.01)
*G01N 21/85* (2006.01)

(52) U.S. Cl. .............. 250/577; 250/573; 250/576; 73/290 R; 73/293

(58) Field of Classification Search .......... 250/573, 250/574, 576, 577; 73/290 R, 291, 293, 73/298; 340/618–620
See application file for complete search history.

(56) References Cited

U.S. PATENT DOCUMENTS

| 4,245,188 A | 1/1981 | Rottmar |
| 5,889,284 A | 3/1999 | Mattis |
| 6,363,784 B1 | 4/2002 | Gregory |
| 6,443,632 B2 | 9/2002 | Ando et al. |
| 6,790,473 B2 | 9/2004 | Papathomas et al. |
| 6,806,509 B2 | 10/2004 | Yoshino et al. |
| 7,262,082 B1 | 8/2007 | Lin et al. |
| 7,285,446 B2 | 10/2007 | Shibata |
| 2008/0107151 A1* | 5/2008 | Khadkikar et al. .......... 374/141 |
| 2008/0144033 A1 | 6/2008 | Milo |

* cited by examiner

*Primary Examiner*—Kevin Pyo
(74) *Attorney, Agent, or Firm*—Weingarten, Schurgin, Gagnebin & Lebovici LLP

(57) ABSTRACT

A fluid overfill probe is resistant to failure caused by physical stresses resulting from thermal expansion of probe components. A fluid level detector is connected to circuit components that are mounted on a circuit board located in a housing of the probe. The circuit board is located within a tube that is positioned within, and secured to the housing, and the circuit board is secured to an inner surface of the tube along its edges. The tube has a shape and rigidity sufficient to maintain a gap between the circuit components and the inner surface of the tube such that thermal expansion of probe components result in no physical stress to the circuit components.

17 Claims, 3 Drawing Sheets

FLUID OVERFILL PROBE WITH THERMAL STRESS PREVENTION

FIELD OF THE INVENTION

This invention relates to fluid control apparatus and, particularly, to optical overfill probes that detect when fluid being transferred into a container has exceeded a desired maximum level and provide a signal used to prevent overfill of the container.

BACKGROUND OF THE INVENTION

In the art of fluid transfer control, particularly as it applies to the petroleum industry, one of the more common control devices is an overfill sensor for determining when the fluid being transferred into a container, such as a petroleum tanker truck compartment, has exceeded a predetermined level. An output signal from such a probe indicates an overfill risk, and may be used by a fluid transfer controller to discontinue fluid flow into the compartment. In this way, overfilling of the compartment, which is particularly hazardous when dealing with flammable liquids such as gasoline, can be avoided. Such a probe 100 is shown schematically in FIG. 1, which shows a partial cross-section diagram of a tanker truck compartment 102, which is being filled with a fluid 104. The probe 100 is connected by wires 108 to an overfill prevention circuit, which is not shown in FIG. 1. Typically, a well 106 is formed around the top of probe 100 in order to contain any fluid 104 that might leak out around the probe 100.

One type of overfill probe that is known in the petrochemical industry makes use of an optical signal generated by a light source, such as a light emitting diode, which signal is coupled into a medium having a relatively high index of refraction, such as a glass or translucent plastic. This medium is specially shaped and commonly referred to as a "prism." The shape of the prism provides multiple surfaces at the interface between the prism material and an external environment, and these surfaces are aligned so as to cause an internal reflection of the optical signal coupled into the prism when the prism is surrounded by air. This internal reflection directs the optical signal toward a photodetector that generates an output signal which indicates that the optical signal is being detected.

A schematic illustration of this prior art probe design 200 is shown in FIG. 2. In the plane of the optical signal path 202, the prism 204 has a triangular cross section. The optical signal is generated by light source 206. When the prism 204 is surrounded by air, the optical signal is reflected at two interfaces between the prism material and the surrounding air, and redirected toward photodetector 208 following the path 202. The photodetector 208 generates an electrical output signal that indicates that the optical signal is being detected. This optical signal is directed to components on a printed circuit board that is located in a probe housing 210 and is surrounded by a potting material 212.

The prism 204 of FIG. 2 is mounted in a prism holder 216 that has properly positioned holes for receiving each of the light source 206 and the photodetector 208, and a partial cutaway region for receiving the prism 204. The prism holder 216 may comprise an elastomer seal and may have a potting compound 218 adjacent to it to help seal the internal components from the external environment. The prism holder 216 helps to maintain the prism, light source and photodetector in an appropriate relative alignment.

When the fluid 104 in the compartment 102 rises high enough to contact a prism surface at a location where the optical signal is incident, the prism/air interface becomes a prism/fluid interface, and the fluid has an index of refraction much closer to the prism material than does air. According to Snell's law of refraction, (well-known in the art of optical design) the angle of incidence of the optical signal at the prism/fluid interface now results in the transmission of the optical signal through the interface due to the similarity of the relative indices of refraction. As a result, the signal is no longer detected by photodetector 208, and the corresponding change in the photodetector output signal is detected by conventional signal processing electronics (not shown in FIG. 2) and used as an overfill warning indicating that loading of the compartment 102 should be discontinued.

Overfill probes of this type may be subjected to a particularly harsh environment. If the compartment contains gasoline or other fuels or harsh chemicals, the probe may be subjected to corrosive vapors. In addition, operating conditions for the compartments often include a wide range of temperature changes. Such changes can put a variety of stresses on the probe that could ultimately lead to its failure. A failure of the probe can cause a false overfill signal to be generated, which prevents fluid from being loaded into the compartment, despite the fact that the compartment may be empty. If this happens, it may be necessary to clean or replace the probe in the field resulting in significant downtime.

SUMMARY OF THE INVENTION

In accordance with the present invention, a fluid overfill probe is provided that avoids failure due to physical stresses resulting from thermal expansion of components of the probe. In particular, an internal structure is used that provides the delicate components of the probe with a gap that separates them from surrounding solid materials. The probe includes a fluid level detector that detects when fluid in a container has reached a predetermined level and generates an electrical output signal indicative thereof. Electrical circuit components mounted to a circuit board process the electrical output signal. A housing surrounds the electrical circuit components and the circuit board is fixed in position relative to the housing. However, the mounting of the circuit board is such that a gap exists between the circuit components and surrounding solid materials in the housing.

The fluid level detector may use a light source that generates an optical signal and a photodetector that detects the optical signal and generates a corresponding electrical output signal. The optical signal is coupled by the light source into a prism that has surfaces oriented such that the optical signal is internally reflected within the prism toward the photodetector when no fluid is in contact with the prism surfaces. However, when the fluid level in a container being monitored reaches the prism, and the fluid makes contact with the prism surfaces, the change in relative index of refraction between the interior and exterior of the prism results in the optical signal exiting the prism prior to reaching the photodetector. As such, the electrical signal output by the photodetector also changes, and this signal change is used to take whatever action is desired in response to the fluid level reaching the probe prism.

To create a desired gap, free of solid material, a receptacle may be used that is located within the housing and surrounds the circuit board. The receptacle may be a tube that is fixed in position relative to the housing, for example, by a potting material that surrounds the tube and cures to a rigid state. The circuit board may be positioned adjacent to an inner surface of the tube along its edges. In such a configuration, the edges of the circuit board may make contact with the tube, preventing movement of the circuit board within the tube, but the shape of the tube is such that the desired gap exists between the inner tube surface and the components on the circuit board. Thus, as solid materials change dimension within the probe due to thermal expansion and contraction, there is no physical stress applied to the electrical components by solid materials in the probe housing that surround the circuit board, as the gap is made sufficiently large as to prevent any such contact for the full predetermined operating temperature range of the probe.

In one embodiment of the invention, the prism, light source and photodetector are attached, in a predetermined orientation, to a prism holder located within the housing. The prism holder may be secured to the tube and, in one embodiment, the tube and the prism holder are integral parts of a single structure. Thus, the proper orientation of the prism is maintained with regard to the light source and the photodetector, and the circuit board, which connects to the light source and photodetector, extends into the tube, where it is secured in a configuration that leaves a gap adjacent to the circuit components.

DETAILED DESCRIPTION

Figure 3A:
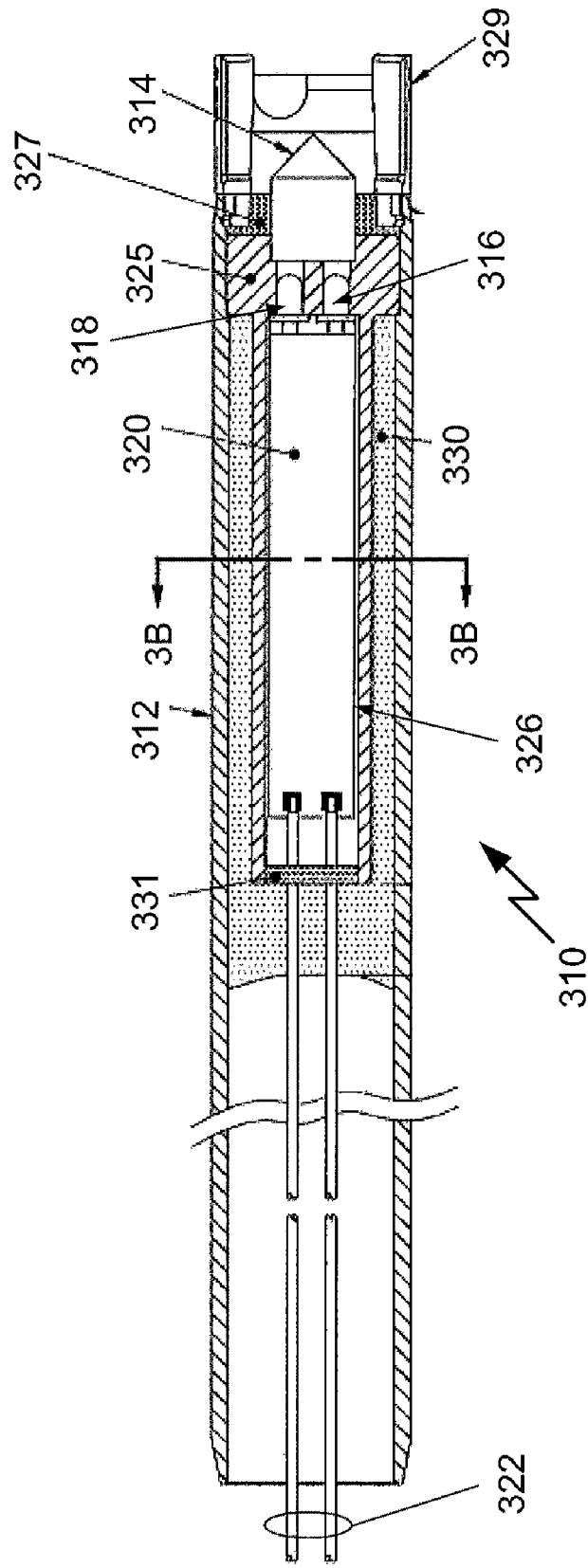
FIG. 3A is a schematic longitudinal cross-sectional view of a fluid overfill probe according to the present invention.

Shown in FIG. 3A is a cross-sectional side view of an overfill probe 310 according to an exemplary embodiment of the present invention. The probe components are encased in a housing 312 of a durable material, preferably a light metal such as aluminum. A prism 314 is located at a first end of the probe that faces the liquid being monitored in a fluid compartment. Adjacent to the prism is light emitting diode (LED) light source 316 and a photodetector 318. As discussed above, an optical signal generated by the light source 316 is coupled into the prism 314 in the direction of the prism surfaces that are contacted by the fluid when the compartment is full. Thus, the signal from the light source is internally reflected and detected by the photodetector when the fluid level is below the position of the probe, due to the large difference in the indexes of refraction of the prism material and the surrounding air. If the fluid level reaches the probe, the refractive index difference is much lower, and the light exits the prism before reaching the photodetector. The change in the output signal from the photodetector is then used by an accompanying overfill control circuit to discontinue filling of the compartment.

The light source 316 and photodetector 318 are both electrically connected to printed circuit board (PCB) 320, which is located within the probe. The PCB 320 supports electrical components used in controlling the operation of the probe, and is connected to external circuitry (not shown) via electrical wires 322. In the present embodiment, the components are surface-mounted to the PCB 320, that is, they rely on a solder connection between them and the board for both electrical conductivity and mechanical attachment. This type of mounting has certain advantages, such as a smaller form factor, but also results in a more fragile arrangement due to the direct solder connection between the components and the PCB, and the lack of a protective housing, as is typically present in lead-mounted packages. Thus, in the present embodiment, the PCB 320 is held firmly in the housing to protect it from shock, vibration, fluids and outside contaminants.

Figure 3B:
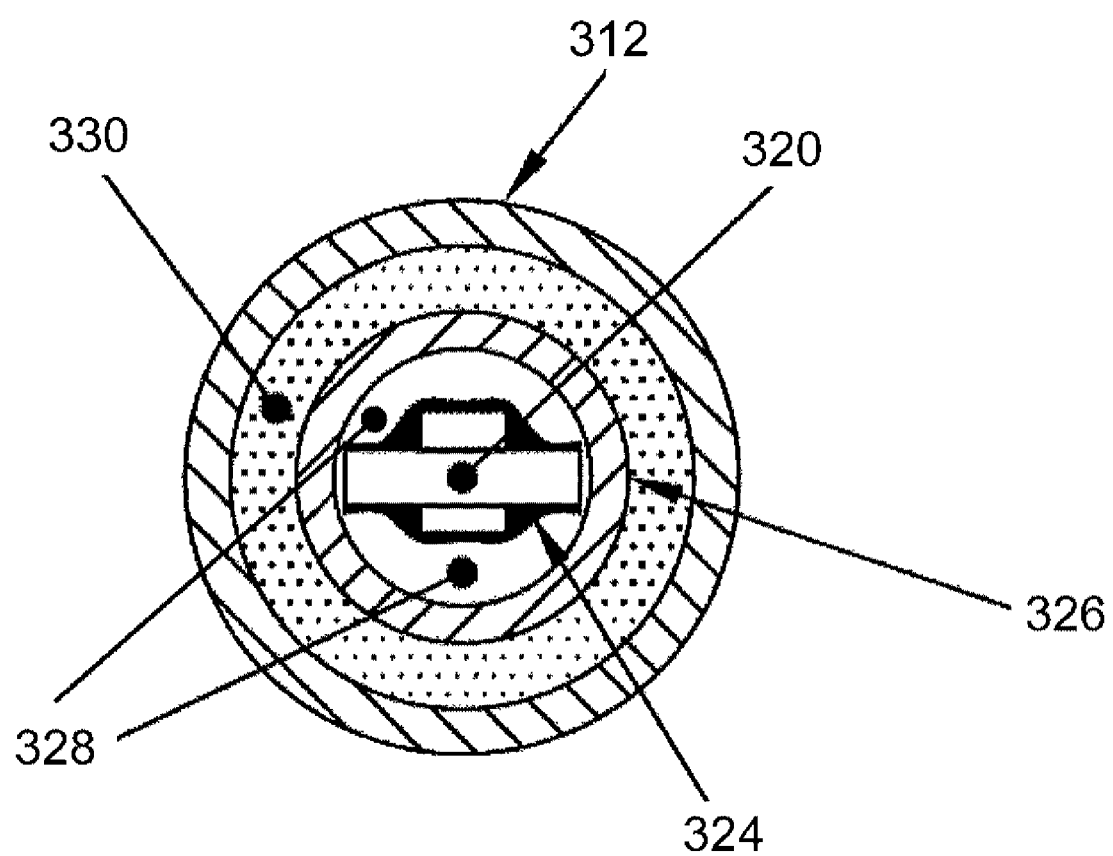
FIG. 3B is a schematic cross-sectional view of the probe of FIG. 3A taken along section line 3B-3B.

The mounting of the PCB 320 is such that it is separated from the housing 312 of the probe by several different interior layers. These layers together combine to protect the PCB in the housing, and are specially arranged to give the PCB 320 a certain level of resistance to thermal stress. Shown in FIG. 3B is a cross-sectional view of the probe taken along sectional line 3B-3B of FIG. 3A. The PCB 320 is shown at the center of housing 312, and is covered by a layer of protective material 324 that, in the present embodiment, is silicone. This layer may be poured onto the assembled PCB structure as a viscous liquid that subsequently hardens, and protects the components while providing a conformal coating sufficient to satisfy various regulatory standards when the probe is used in conjunction with hazardous liquids.

Figure 1:
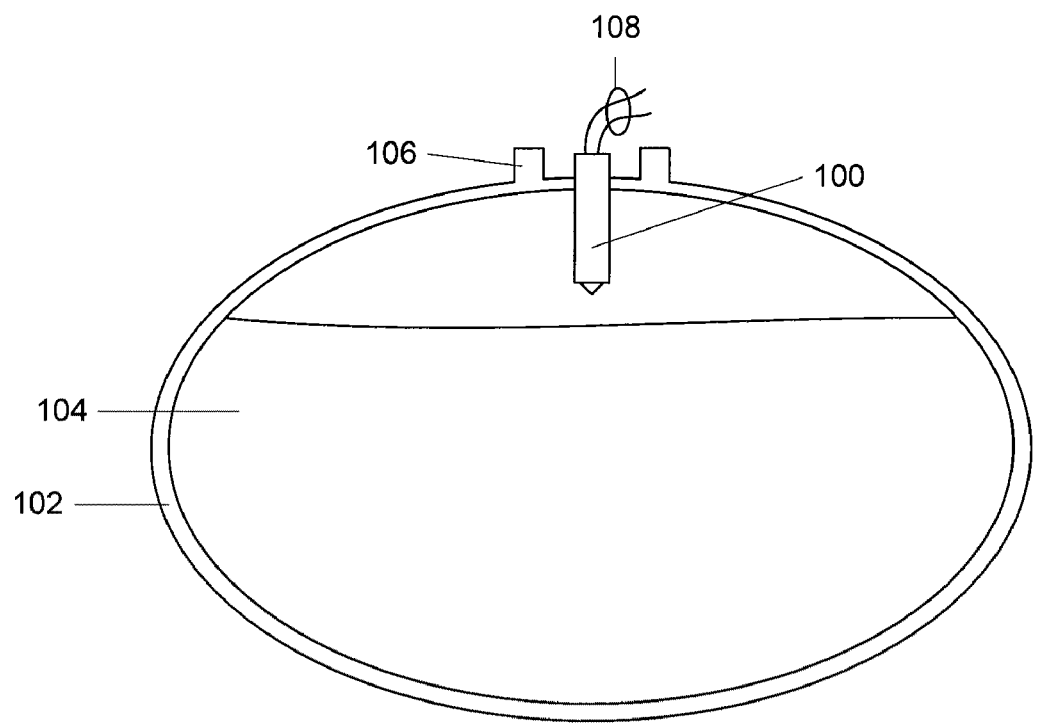
FIG. 1 is a schematic cross-sectional view of a fluid container monitored by a fluid overfill probe, as known in the prior art.
Figure 2:
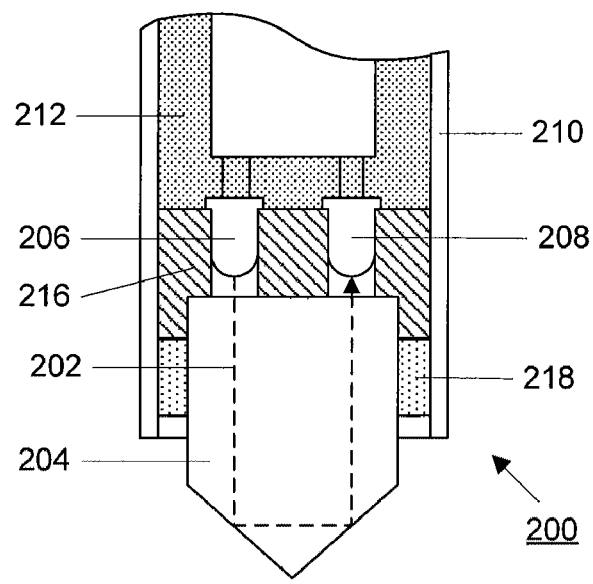
FIG. 2 is a partial schematic cross-sectional view of a fluid overfill probe according to the prior art.

Surrounding the silicone-coated PCB is a tube 326 that is sufficiently rigid to maintain its shape under minor external pressure. The tube 326 has an interior diameter that is selected relative to the size of the PCB so that the PCB makes a snug fit within the tube 326. The tube 326 is integral with a prism holder 325 (FIG. 3A) in which the prism 314, light source 316 and photodetector 318 are mounted in a manner similar as discussed above with regard to FIG. 2. The tube 326 and the prism holder 326 may be separate components that are secured together or may be one integral component. In the present embodiment, the tube 326 and prism holder 325 comprise a single piece of black nitrile. Thus, the PCB 320 is located within the tube 326 and the light source 316 and photodetector 318 extend from the PCB 320 into the prism holder 325.

In one embodiment, the tube and the PCB are sized relative to each other so that the board makes a loose interference fit with the tube. In another embodiment, the inner surface of the tube has grooves that receive the edges of the board and thereby retain the board in a predetermined position and orientation within the tube. This latter embodiment simplifies aligning the board with the tube so that the light source and photodetector engage properly in their intended holes in the prism holder 325. This is a particularly useful feature when the tube is an opaque material, as it facilitates proper alignment of the PCB 320 in the tube 326. As shown in FIG. 3A, a layer 327 of potting material may also be located adjacent to the prism holder that helps isolate the interior of the probe from the external environment. The portion of the probe extending beyond the potting material layer 327 is encompassed by a prism protector that prevents damage to the prism while still allowing fluid to make contact with the prism surface. At the opposite end of the tube 326 a seal 331 may also be used to close the tube end. The seal may be, for example, a solid or a curable liquid.

As shown in FIG. 3B, the width of the PCB itself is the maximum radial dimension of the PCB assembly when located in the tube 326. Thus, while the edges of the PCB 320 may make contact with an inner surface of the tube 326, an air gap 328 exists on either side of the PCB between the silicone-coated components and the inner tube surface. These air gaps 328 are created by the rigidity of the tube 326 that allows it to maintain its shape during assembly of the probe. Once the PCB 320 is located in the tube 326, the tube is sealed, the prism holder being secured to the tube if it is not part of the same integral structure, and the sealing material 331 being applied at the opposite end. Thus, electrical wires 322 extend through the seal 331 at one end and the light source and photodetector extending into prism holder 326 at the other.

The sealed tube is then placed within the housing 312, and the space between the tube and the housing is filled with a potting material 330, such as a hard-curing epoxy. This secures the tube 326 relative to the housing 312, preventing it from moving within the housing. The potting material may also be selected to protect the tube from external contaminants, vibration and shock.

The formation of air gaps 328 within the body of the probe has been found to prevent damage to the components on the PCB that may otherwise be caused by physical stress induced by thermal expansion of components in the probe. In particular, the air gaps 328 provide a separation between the electrical components on the PCB 320 and the tube 326. Thus, thermal expansion and contraction of the protective layer 324 and/or of the tube 326 and potting material 330 does not create physical stress on the circuit components. In contrast, if the protective layer surrounding the electrical components were directly adjacent to, or in direct contact with, a surrounding material, such as a potting compound, the thermal expansion and contraction of the solid materials in the probe could result in physical stress on the circuit components leading to their failure. Since overfill probes such as that described in the present embodiment are intended for use across a wide temperature range (as much as a one hundred degree Celsius temperature change), the present invention provides an overfill probe that prevents thermal stresses that might otherwise result in probe failure.

The present embodiment uses a tube to house the PCB board in a manner that provides gaps around the circuit components. However, those skilled in the art will recognize that a variety of different techniques may be used to provide such gaps. The effect of the tube is to provide a physical isolation between solid materials in the probe body that, if not so isolated, could create physical stresses on circuit components due to relative thermal expansions and contractions. Other means of providing such isolation are considered to be anticipated by the principle of the present invention. Moreover, while the gaps are referred to herein as "air gaps," the invention contemplates any gap that is free of solid material. Such a gap may be occupied by different gases than air, or even certain fluids having appropriate thermal characteristics.

While the invention has been shown and described with regard to an exemplary embodiment thereof, it will be recognized by those skilled in the art that various changes in form and detail may be made herein without departing from the spirit and scope of the invention as defined by the appended claims.

What is claimed is:

1. A fluid overfill probe comprising:
   a cylindrical housing comprising a light metal and having a first outer diameter and a first inner diameter;
   a tube disposed in the cylindrical housing, the tube having an integrated prism holder, and the tube having a second outer diameter and a second inner diameter, the second outer diameter smaller than the first inner diameter of the cylindrical housing;
   a fluid level detector coupled to the tube that detects when fluid in a container has reached a predetermined level and generates an electrical output signal indicative thereof; and
   electrical circuit components that process the electrical output signal, the electrical circuit components being mounted to a printed circuit board, wherein the printed circuit board is disposed in the tube and coupled to the tube by an interference fit between the printed circuit board and an inner surface of the tube, the printed circuit board having a first thickness, a first width and a first length,
   wherein the printed circuit board defines a first inner space between the tube and a first side of the printed circuit board and defines a second inner space between the tube and a second side of the printed circuit board,
   wherein each of the first and second inner spaces is free of solid material, and
   wherein a space between the tube and the cylindrical housing is filled with a material to prevent the tube from moving within the housing.

2. A fluid overfill probe according to claim 1 wherein a potting material is located in the space between the housing and the tube.

3. A fluid overfill probe according to claim 1 wherein the fluid level detector comprises:
   a light source;
   a photodetector; and
   a prism into which an optical signal from the light source is coupled, the prism having surfaces oriented such that the optical signal is internally reflected toward the photodetector when no fluid is in contact with the prism surfaces, and such that the optical signal exits the prism prior to reaching the photodetector when a fluid is in contact with the prism surfaces,
   wherein the prism is disposed in the integrated prism holder.

4. A fluid overfill probe according to claim 3 wherein the prism, light source and photodetector are arranged in a predetermined orientation in the prism holder.

5. A fluid overfill probe for determining when fluid in a container being monitored has reached a predetermined level, the probe comprising:
   a light source that generates an optical signal;
   a photodetector that can detect the optical signal and generate an electrical output signal in response thereto;
   a prism into which the optical signal of the light source is coupled, the prism having surfaces oriented such that the optical signal is internally reflected toward the photodetector when no fluid is in contact with the prism surfaces, and such that the optical signal exits the prism prior to reaching the photodetector when a fluid is in contact with the prism surfaces;
   a circuit board comprising electrical circuit components that process the electrical output signal;
   a cylindrical housing that surrounds the circuit board and electrical circuit components; and
   a tube disposed within the housing and within which the circuit board is located, the circuit board being positioned within the receptacle such that a first inner space is defined between the tube and a first side of the circuit board and a second inner space is defined between the tube and a second side of the circuit board,
   wherein each of the first and second inner spaces is free of solid material, and
   wherein a space between the tube and the cylindrical housing is filled with a material to prevent the tube from moving within the housing.

6. A fluid overfill probe according to claim 5 wherein a potting material is located in the space between the housing and the tube.

7. A fluid overfill probe according to claim 5 further comprising a prism holder to which the prism, light source and photodetector are attached in a predetermined orientation, the prism holder being secured to the tube.

8. A fluid overfill probe according to claim 7 wherein the prism holder and the tube are integral parts of a single structure.

9. A fluid overfill probe according to claim 5, wherein the cylindrical housing comprises a light metal.

10. A fluid overfill probe according to claim 5, wherein the circuit board is press-fit into the tube.

11. A fluid overfill probe according to claim 5, further comprising:
- a first inner groove along an inner portion of the tube, the first inner groove having a size about the same as the first thickness of the printed circuit board,
- wherein a first edge of the printed circuit board is positioned in the first groove.

12. A fluid overfill probe according to claim 11, further comprising:
- a second inner groove along an inner portion of the tube, the second groove having a size about the same as the first thickness of the printed circuit board,
- wherein a second edge of the printed circuit board is positioned in the second groove.

13. A fluid overfill probe according to claim 12, wherein:
- the first and second grooves are provided in the tube so as to position the printed circuit board in a predetermined orientation with respect to the prism holder.

14. A fluid overfill probe according to claim 5, wherein the material between the tube and the cylinder comprises hard-curing epoxy.

15. A fluid level probe according to claim 1, further comprising:
- a first inner groove along an inner portion of the tube, the first inner groove having a size about the same as the first thickness of the printed circuit board,
- wherein a first edge of the printed circuit board is positioned in the first groove.

16. A fluid level probe according to claim 15, further comprising:
- a second inner groove along an inner portion of the tube, the second groove having a size about the same as the first thickness of the printed circuit board,
- wherein a second edge of the printed circuit board is positioned in the second groove.

17. A fluid level probe according to claim 16, wherein:
the first and second grooves are provided in the tube so as to position the printed circuit board in a predetermined orientation with respect to the prism holder.

* * * * *